United States Patent
Gay et al.

(10) Patent No.: US 8,069,117 B1
(45) Date of Patent: Nov. 29, 2011

(54) AD HOC ACCESS RIGHTS IN RESTRICTED-ACCESS ELECTRONIC SPACE

(75) Inventors: Jonathan Gay, Mill Valley, CA (US); Giacomo Guilizzoni, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1176 days.

(21) Appl. No.: 10/856,424

(22) Filed: May 28, 2004

(51) Int. Cl.
*G06F 21/00* (2006.01)

(52) U.S. Cl. .......................................... 705/54; 705/18

(58) Field of Classification Search ............... 705/50–79
See application file for complete search history.

(56) References Cited

U.S. PATENT DOCUMENTS

| | | | |
|---|---|---|---|
| 5,471,318 A | 11/1995 | Ahuja et al. | |
| 5,999,208 A | 12/1999 | McNerney et al. | |
| 6,119,147 A | 9/2000 | Toomey et al. | |
| 6,144,991 A | 11/2000 | England | |
| 6,233,600 B1 | 5/2001 | Salas et al. | |
| 6,237,025 B1 | 5/2001 | Ludwig et al. | |
| 6,334,141 B1 | 12/2001 | Varma et al. | |
| 6,519,629 B2 | 2/2003 | Harvey et al. | |
| 6,594,664 B1 | 7/2003 | Estrada et al. | |
| 6,636,889 B1 | 10/2003 | Estrada et al. | |
| 6,938,069 B1 | 8/2005 | Narayanaswamy | |
| 6,988,127 B2 | 1/2006 | Matsuda et al. | |
| 7,127,524 B1 * | 10/2006 | Renda et al. ................... 709/245 |
| 7,219,107 B2 | 5/2007 | Beringer | |
| 7,234,117 B2 | 6/2007 | Zaner et al. | |
| 7,249,157 B2 | 7/2007 | Stewart et al. | |
| 7,382,756 B2 * | 6/2008 | Barber et al. ................. 370/338 |
| 7,383,302 B2 | 6/2008 | Cohen et al. | |
| 2002/0049786 A1 | 4/2002 | Bibliowicz et al. | |
| 2002/0075305 A1 | 6/2002 | Beaton et al. | |
| 2002/0129106 A1 | 9/2002 | Gutfreund | |
| 2002/0130904 A1 | 9/2002 | Becker et al. | |
| 2002/0156808 A1 | 10/2002 | Duffy et al. | |
| 2003/0023677 A1 | 1/2003 | Zuill et al. | |
| 2003/0041998 A1 | 3/2003 | Exton et al. | |
| 2004/0081951 A1 | 4/2004 | Vigue et al. | |
| 2005/0114475 A1 | 5/2005 | Chang et al. | |
| 2006/0041505 A1 * | 2/2006 | Enyart .......................... 705/40 |
| 2006/0053196 A1 | 3/2006 | Spataro et al. | |
| 2006/0182249 A1 | 8/2006 | Archambault et al. | |
| 2006/0242632 A1 | 10/2006 | Orsolini et al. | |

OTHER PUBLICATIONS

Office Action of Mar. 18, 2009 in U.S. Appl. No. 11/182,503.
Office Action of Oct. 7, 2008 in U.S. Appl. No. 11/182,503.
Interview Summary of Dec. 17, 2008 in U.S. Appl. No. 11/182,503.
Office Action dated Sep. 15, 2009 in U.S. Appl. No. 11/182,503.
Final Office Action dated Apr. 13, 2010 in U.S. Appl. No. 11/182,503.
Advisory Action dated Jul. 2, 2010 in U.S. Appl. No. 11/182,503.

* cited by examiner

*Primary Examiner* — Andrew J. Fischer
*Assistant Examiner* — Thomas West
(74) *Attorney, Agent, or Firm* — Kilpatrick Townsend & Stockton LLP

(57) ABSTRACT

One embodiment of the present invention provides the administrator of an access restricted electronic system with a flexible management scheme. In this scheme, users request access to the electronic system. Users who submit verified access information, such as a login identification and password, are immediately granted access as authorized users. Users who have not submitted access information, are presented to the administrator through an interface that enables the administrator to grant ad hoc access.

17 Claims, 4 Drawing Sheets

AD HOC ACCESS RIGHTS IN RESTRICTED-ACCESS ELECTRONIC SPACE

TECHNICAL FIELD

Embodiments of the present invention are directed to the management of access-restricted information space, and specifically to providing administrators and moderators the flexibility of granting ad hoc access rights.

BACKGROUND OF THE INVENTION

In an increasingly electronic and interconnected world, more information is being contained in various electronic formats, and widely-separated individuals are more often using electronic meeting spaces to collaborate virtually. As more types of information are stored and exchanged electronically, monitoring and controlling access to that information becomes increasingly important. Administration of a database, or any other form of electronic information or meeting space, includes the ability to control who is and who is not allowed access to that information. However, as the information space becomes more restrictive, or the collaboration becomes more selective, much of the flexibility that makes electronic collaboration and electronic information advantageous can be lost.

To gain access to a typical secure information space, a requester might submit information that allows the system to verify that requester's identity. This may be in the form of a user identification (user ID), an alphanumeric password (for example, a Personal Identification Number (PIN)), or the like, that is uniquely linked with the requester. This information is typically issued by a moderator or administrator prior to the request for access. Regardless of what method of requester identification is used, however, this identification information is typically acquired or set up prior to the requester's first request to access the system. The delay, which may only take a few seconds, allows an administrator or an administrative computer program to enter the identifying information into the system and issue to the requester either the appropriate access or login information or confirmation of that information. In some systems, the administrator or administration program may also choose to independently verify the identification of the requester prior to issuing the login information. In such systems, it may take a much longer time to obtain the access information.

For example, the Institute of Electrical and Electronic Engineers (IEEE) maintains an Internet-based database of published articles. To gain access, a requester first applies to the IEEE administrator for permission to do so. Upon approval, the administrator issues a login name and a password to the requester. Once this information is received, the requester may use the login name and password to gain access to the database. However, without this information, a requester will not be allowed access, even if the requester is a valid member with access rights to the database.

Similar systems are used for the management of collaboration in an electronic meeting space. Electronic presentation and online broadcast technology now allow people to "attend" a virtual presentation, meeting, or other collaboration over a network of computers. Recent advancements in networking and online broadcasting technology have led to a rapid increase in the use of such virtual electronic meetings within large corporations, particularly over intranets. The advantages of virtual presentation broadcasts are even greater over the Internet, which reaches an even wider audience.

Many software products and services have been developed to facilitate such on-line meetings or collaborations. Products and services, such as WEBEX COMMUNICATIONS, INC.'s WEBEX$^{SM}$, and the like, facilitate the electronic collaboration of individuals in an electronic meeting space over the Internet or other proprietary distributed network. Typically, on-line meeting or collaboration products allow meeting preparers to send access or login information to everyone they desire to have attend the meeting. Participants, themselves, may also request such access or login information from the meeting preparers. After approval, the requesting participants will receive the access information from the preparer, the requester or participant may use to access the electronic meeting space. However, a person who desires to participate in the electronic meeting but does not have login or access information, or an approved participant who has lost his or her access information, may be unable to access the electronic meeting.

BRIEF SUMMARY OF THE INVENTION

One embodiment of the present invention provides the administrator of an access-restricted electronic system with a flexible management scheme. In this scheme, users request access to the electronic system. Users who submit verified access information, such as a login and password that identifies an individual or entity as one who is allowed access, are immediately granted access as authorized users. Users who have not submitted access information, are presented to the administrator through an interface that enables the administrator to grant ad hoc access.

A further embodiment of the present invention may comprise a server hosting an electronic information space. A database in communication with the host server can store user information used to verify access information submitted by users requesting access. If a user requests access without access information, a request interface can be presented to the administrator of the system enabling him/her to grant temporary or limited access to users without specific access information.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Embodiments of the present invention allow moderators and administrators more flexibility regarding who may access a restricted information space, such as a database or electronic meeting space. Using an embodiment of the present invention, the administrator of a secure journal archive database, for example, would be able to immediately grant one time or limited access to a visiting user. Using another embodiment, the moderator of an electronic collaboration may grant ad hoc access to an invited member who has forgotten his password.

Figure 1:
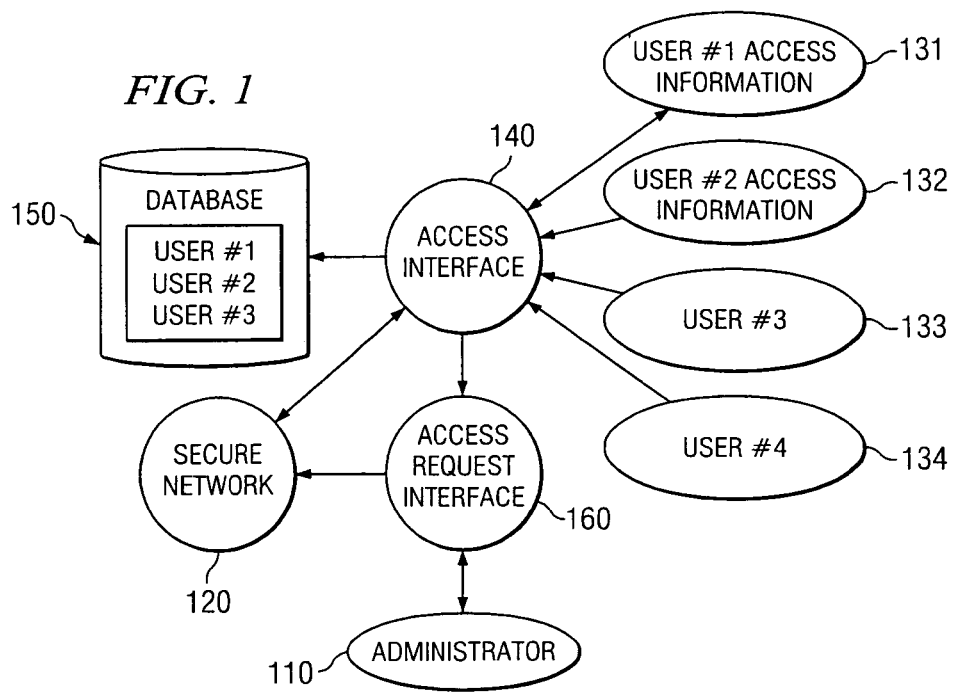
FIG. 1 is a block diagram illustrating a system for managing an information space in accordance with an embodiment of the present invention.

FIG. 1 is a block diagram illustrating a system in accordance with an embodiment of the present invention. Administrator 110 is tasked with the administration of secure network 120. Secure network 120 may be a secure database, a secure server hosting an internet collaboration, or any other access-controlled electronic system. Administrator 110 may be a network administrator, a secure host server, the presenter of an electronic meeting, or any other individual with the authority to permit access. Neither network 120 nor administrator 110 is limited to any particular form, but rather may take any form appropriate for the access restricted information space application in use.

The example application of FIG. 1 controls which of users 131-134 may access secure network 120 by using access interface 140. Access interface 140 is designed to allow a user to access secure network 120 in a plurality of ways. One manner of access requires the user to pre-register with access interface 140. This pre-registration causes user information to be stored in database 150, and causes access information to be issued to a user. Embodiments of the present invention are not limited to any specific type of access information or user information, but rather are capable of utilizing any form of user information that adequately identifies a user requesting access and any form of access information that identifies the user to the system. When user 131, who has pre-registered, desires to access secure network 120, user 131 contacts access interface 140 and submits his access information 141. Access information 141 may take the form of a login identification and password or any other appropriate format. Access interface 140 may then verify part or all of access information 141 with the associated user information 151 stored in database 150. Once access information 141 is verified, user 131 is permitted access to secure network 120. For example, verification may trigger a flag. If the entered PIN is matched on the database, the flag is set thereby telling the interface to allow the user access to the secure network.

A second form of access allowed by access interface 140 is through an ad hoc request. A user, such as user 134, may not have pre-registered or, such as user 133, may have pre-registered but may no longer be in possession of his or her access information. Even without access information, users 133 and 134 may still gain access to secure network 120. In the embodiment depicted in FIG. 1, a user requesting access without access information will cause access interface 140 to communicate with request interface 160. Through request interface 160, administrator 110 may preview a requester, such as user 133 or 134, to determine the identity or other pertinent information. A requester, such as user 133 or 134, may identify themselves in real time to administrator 110 in any appropriate manner. The requester may submit a name, an electronic mail address, an internet protocol (IP) address, or any other form of identification, whether or not it is verifiable. Based on this information, administrator 110 may then use request interface 160 to permit requesters, such as users 133 and 134 access to secure network 120 on a temporary basis using any appropriate means. For example, request interface 160 may allow the administrator to set the flag telling the interface to allow user 134 onto the secure network. Because the access authorization is temporary, once user 134 logs off of the secure network, the access flag or other access acknowledgement is automatically reset, such that user 134 would be denied access if he or she attempted to log on again without seeking permission from the administrator. In an alternative embodiment, access interface may add a temporary user to database 150 by storing information (such as IP addresses) identifying a user who has requested and been permitted ad hoc access. If user 134 is granted temporary access, for example, some identifying information for user 134 would be stored in database 150. Upon user 134 logging off, the identifying information for user 134 would then be removed, such that user 134 would be denied access if he or she attempted to log on again without seeking permission from the administrator.

Figure 2:
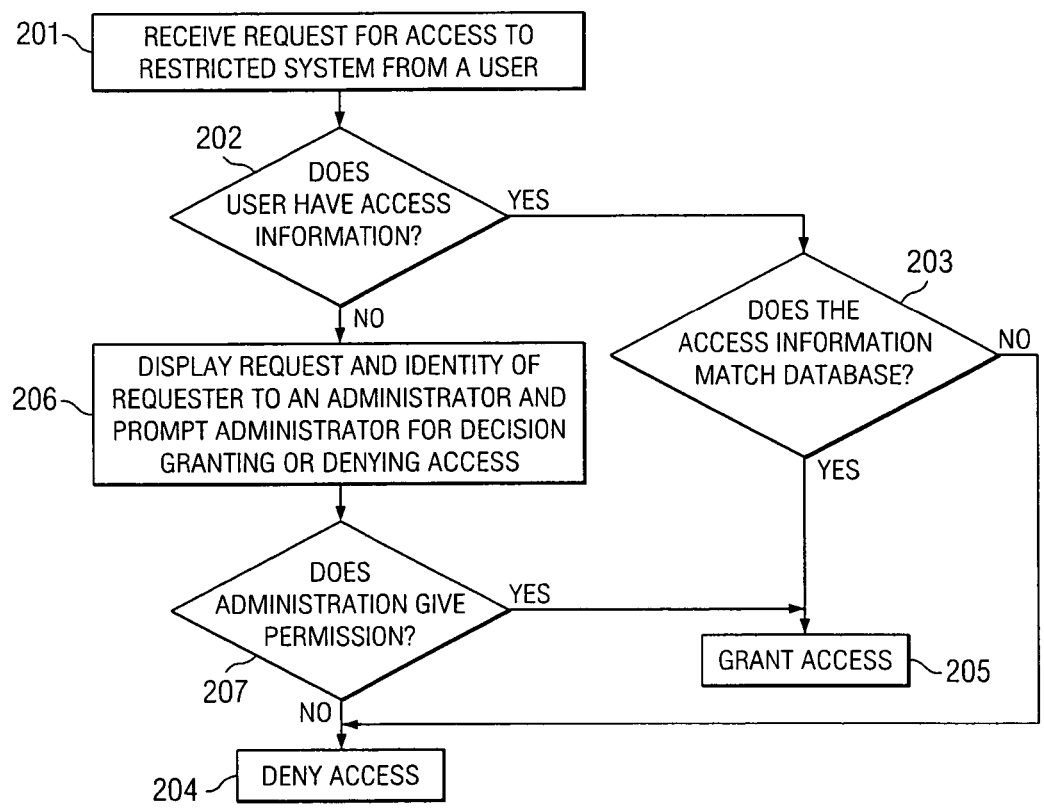
FIG. 2 is a flow diagram illustrating a method of granting access to an electronic system in accordance with one embodiment of the present invention.

FIG. 2 is a flow diagram illustrating a method of granting access to an electronic system in accordance with one embodiment of the present invention. In step 201, a user requests access to a restricted system. In step 202, the user is prompted for access information. If the user possesses access information, as in step 203, the access information is compared with an associated record on a database. If the access information matches what is stored on the database, as in step 204, access is granted. If the access information does not match what is stored on the database, as in step 205, access is denied. If, alternatively, the user is unable to provide access information in step 202, then, in step 206 the identity of the user is displayed to the administrator. In step 207, the administrator is prompted to grant access, in step 205, or deny access, in step 204.

Figure 3:
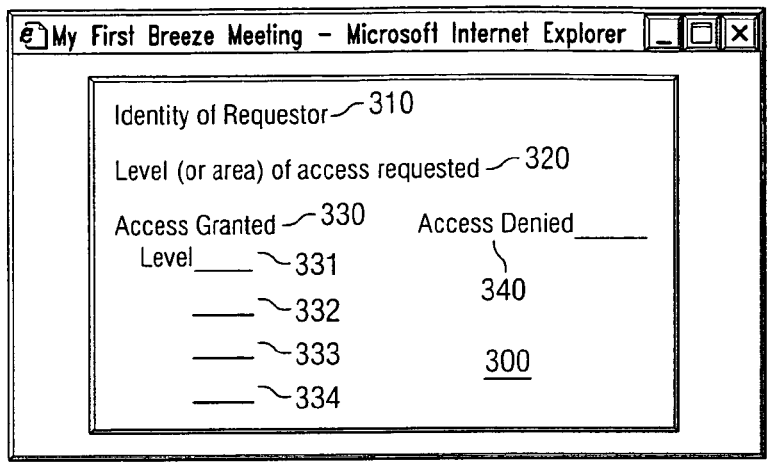
FIG. 3 is an illustration of an access interface in accordance with an embodiment of the present invention.

FIG. 3 is an illustration of request interface 300 in accordance with another embodiment of the present invention. Interface screen 300 may be presented to an administrator or moderator when a user, who does not possess the access information used by the application, requests access to the system or meeting or other restricted-access electronic space. Screen 300 provides the administrator with user identity 310. As many applications may allow varying levels of access privileges, screen 300 may also provide the level of access requested 320. The request interface of FIG. 3 also enables the administrator to respond to the request. Access granted option 330 allows the administrator to approve the user for access and may further provide the ability to select an access level 331-334. Access levels 331-334 may provide an administrator to grant the user the ability to view only certain portions of the electronic meeting space, to be permitted read only access, full access, or any appropriate access level. Access levels 331-334 may also include an option granting a requester only temporary access. Such an option may allow a user access that expires after a period of time, at the conclusion of an electronic collaboration, or other appropriate interval. Alternatively, the administrator may select access denied option 340, thus, refusing the user's request.

Figure 4:
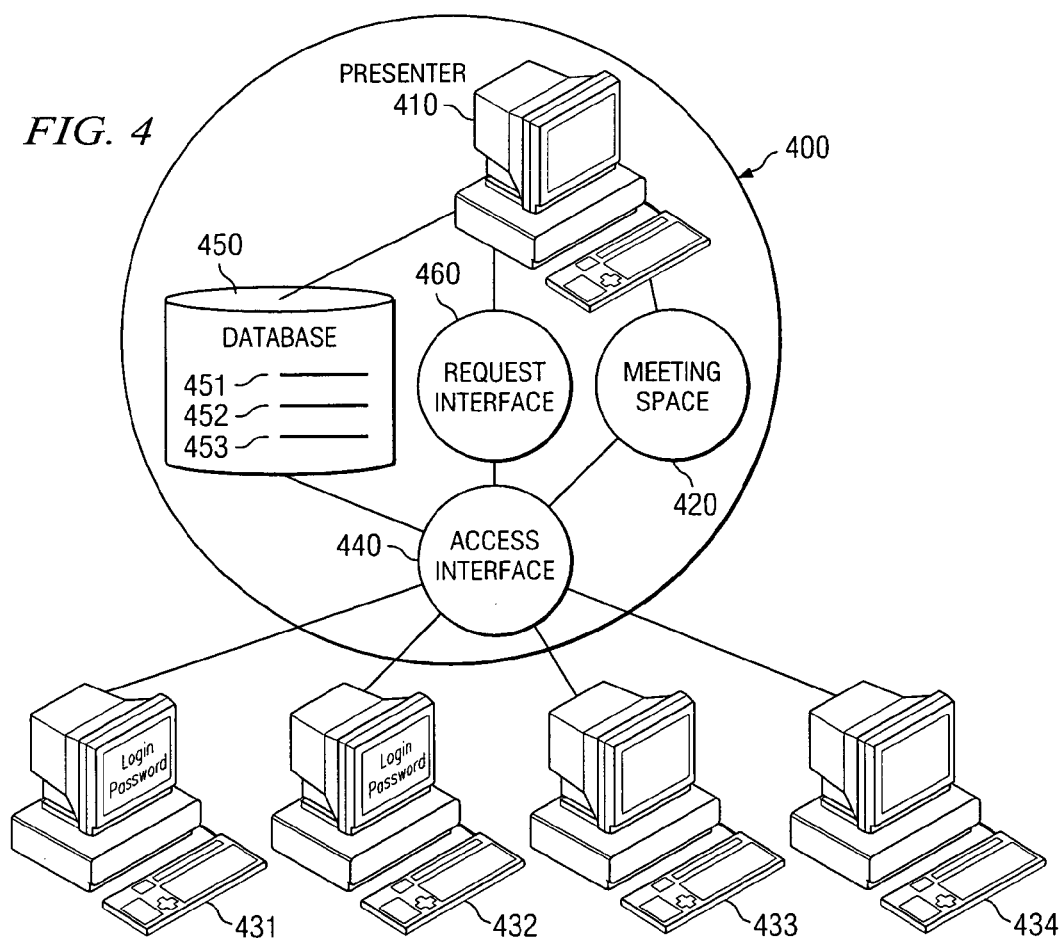
FIG. 4 is a illustrates a system for managing a meeting space in accordance with an embodiment of the present invention.

FIG. 4 illustrates a system for managing a meeting space in accordance with an embodiment of the present invention. In system 400, presenter 410 presides over an electronic collaboration within meeting space 420. Participants 431-434 are geographically dispersed individuals who wish to electronically connect whether through the Internet, an Intranet, the World Wide Web or other like means, to meeting space 410 through access interface 440. Access interface 440 accepts access information, such as a previously distributed login and password. This access information is then verified with information stored in database 450. However, some participants may desire access to meeting space 420, but, either do not remember their access information, such as participant 433, or were never issued access information, such as participant 434. In this eventuality, a request from participant 433 or 434 for access to meeting space 420, causes access interface 440 to communicate with presenter 410 through request interface 460. Request interface 460 displays to presenter 410 the identity of the participant requesting access to the meeting space without access information, in this case participants 433 and 434. Presenter 410 may then use request interface 460 to allow or deny access to the requesting participant. Request interface, in one embodiment, may then associate a flag with participants 433 and 434 which signals to access interface 440 to permit or deny access to meeting space 420. Alternatively, request interface 460 may be capable of temporarily storing information regarding participants 433 and 434 in database 450 such that access interface 440 is triggered to permit or deny access.

Figure 5A:
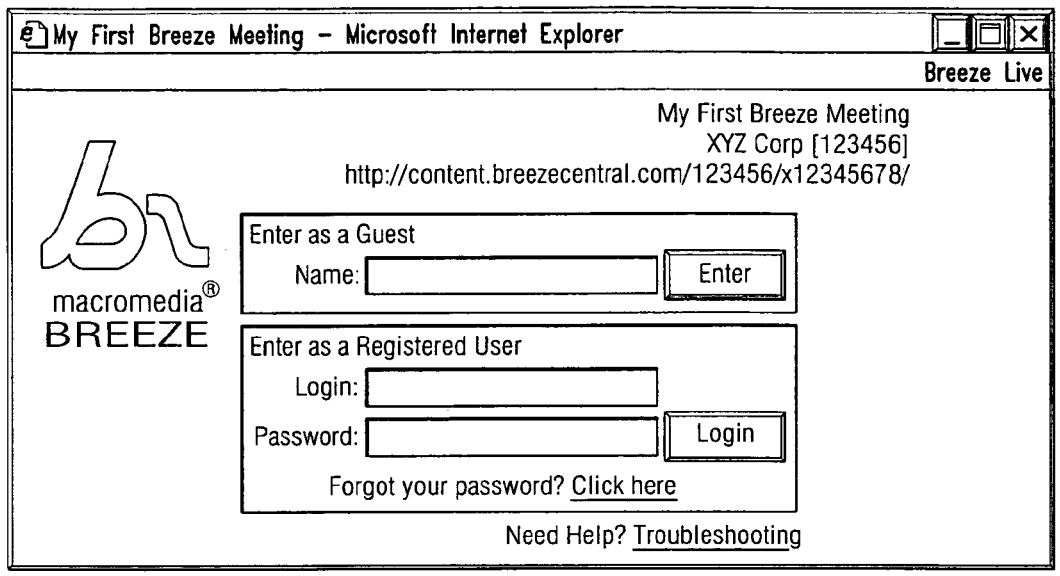
FIGS. 5A and 5B illustrate a request interface in accordance with one embodiment of the present invention.
Figure 5B:
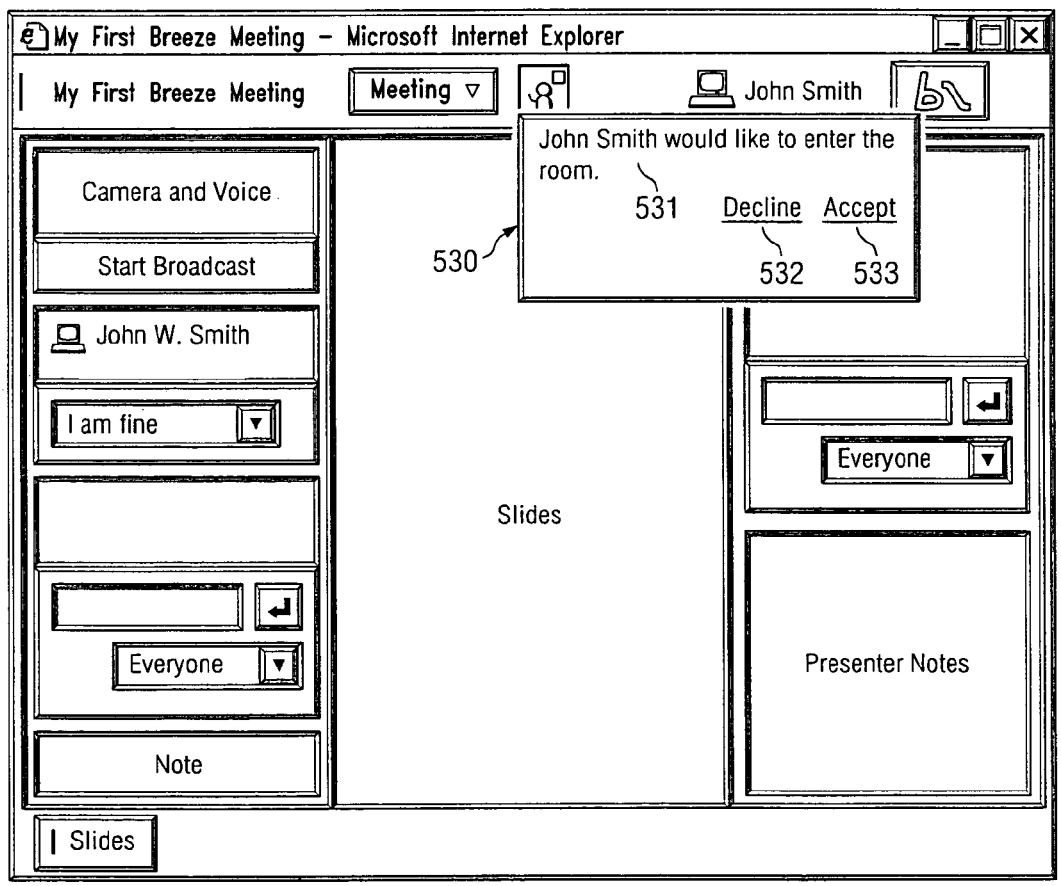

FIGS. 5A and 5B illustrate a request interface in accordance with one embodiment of the present invention. The illustrated example is an electronic meeting space generated by MACROMEDIA'S BREEZE® software. However, embodiments of the present invention are not limited to the particular implementation of BREEZE®, and may be used with any application capable of generating a meeting space. FIG. 5A is an example login screen for a participant, such as participants 431-434 of FIG. 4, who wish to access a restricted meeting space. Login 510 permits a requester, such as participants 431 and 432 of FIG. 4, to provide an access interface with access information, such as login 511 and password 512. Upon verification of this access information, a participant would be permitted access. Alternatively, a requestor, such as participants 433 and 434, who do not possess access information may simply submit identifying information 520 in real time to a moderator. This information may be a name, an electronic mail address, an internet protocol (IP) address, or any other form of identification, whether or not it is verifiable.

FIG. 5B is an example of access request interface 530 for a moderator of an electronic meeting. When a participant requests access without access information, request interface can display to the moderator access request interface 530. Using access request interface 530, the moderator can identify requestor 531 and select a decline access trigger 532 or an accept access trigger 533.

When implemented via computer-executable instructions, various elements of embodiments of the present invention are in essence the software code defining the operations of such various elements. The executable instructions or software code may be obtained from a computer readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, computer readable media can include any medium that can store or transfer information.

Figure 6:
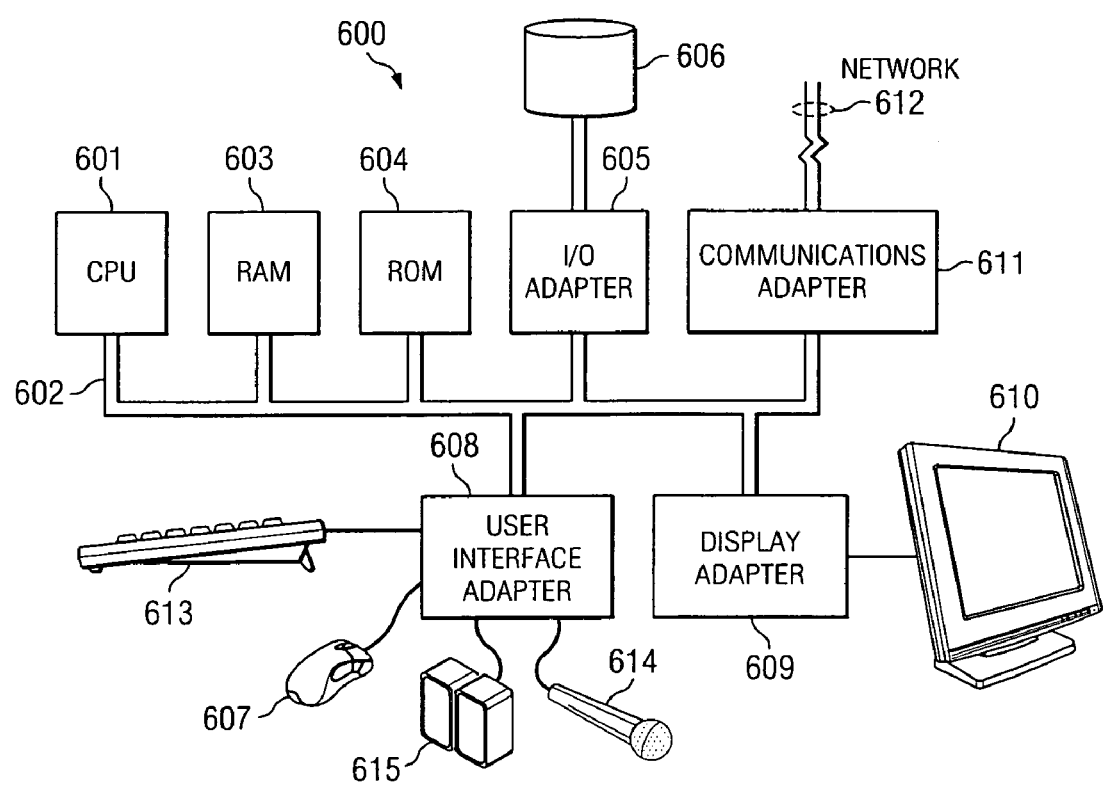
FIG. 6 is an example computer system in accordance with an embodiment of the present invention.

FIG. 6 illustrates an example computer system 600 adapted according to embodiments of the present invention. That is, computer system 600 comprises an example system on which embodiments of the present invention may be implemented. Central processing unit (CPU) 601 is coupled to system bus 602. CPU 601 may be any general purpose CPU. Suitable processors include without limitation INTEL's PENTIUM® 4 processor, as an example. However, the present invention is not restricted by the architecture of CPU 601 as long as CPU 601 supports the inventive operations as described herein. CPU 601 may execute the various logical instructions according to embodiments of the present invention. For example, CPU 601 may execute machine-level instructions according to the exemplary operational flows described above in conjunction with FIG. 2.

Computer system 600 also preferably includes random access memory (RAM) 603, which may be SRAM, DRAM, SDRAM, or the like. Computer system 600 preferably includes read-only memory (ROM) 604 which may be PROM, EPROM, EEPROM, or the like. RAM 603 and ROM 604 hold user and system data and programs, as is well known in the art.

Computer system 600 also preferably includes input/output (I/O) adapter 605, communications adapter 611, user interface adapter 608, and display adapter 609. I/O adapter 605, user interface adapter 608, and/or communications adapter 611 may, in certain embodiments, enable an administrator or moderator to interact with computer system 600 via the interface of FIG. 3 or FIG. 5.

I/O adapter 605 preferably connects to storage device(s) 606, such as one or more of hard drive, compact disc (CD) drive, floppy disk drive, tape drive, etc. to computer system 600. The storage devices may be utilized when RAM 603 is insufficient for the memory requirements associated with storing data for user information. Communications adapter 611 is preferably adapted to couple computer system 600 to network 612. User interface adapter 608 couples user input devices, such as keyboard 613, pointing device 607, and microphone 614 and/or output devices, such as speaker(s) 615 to computer system 600. Display adapter 609 is driven by CPU 601 to control the display on display device 610 to, for example, display the request interface of FIG. 3.

It shall be appreciated that the present invention is not limited to the architecture of system 600. For example, any suitable processor-based device may be utilized, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A system comprising:
a database of authorized users; and
a server configured to host said system, the server configured to:
receive a request for a requester to access an electronic meeting hosted by the server;
based on determining that the request provides information sufficient for the server to automatically associate the requester with an authorized user in the database of authorized users, grant access to the requester;
based on determining that the request does not provide information sufficient for the server to automatically associate the requester with an authorized user in the database of authorized users, provide a graphical user interface in real time during the electronic meeting comprising a request interface, wherein said request interface provides user identification information from the request and receives input to grant or deny access to said requester.

2. The system of claim 1 wherein said access request comprises access information.

3. The system of claim 2 wherein said access information comprises:
a login identification and a password.

4. The system of claim 1 wherein said request interface comprises:
an option menu integrated into the graphical user interface.

5. The system of claim 4 wherein said option menu comprises one or more of a plurality of access rights.

6. The system of claim 5 wherein one or more of a plurality of access rights comprises a right to access a single session.

7. The system of claim 4 wherein the option menu comprises an option to deny access to said requester.

8. A method comprising:
receiving, by at least one computing device comprised in an access-restricted system, a request for a requester to access an electronic meeting hosted by the access-restricted electronic system;
based on determining that the request provides access information sufficient for the at least one computing device to automatically verify the access information, granting, by the at least one computing device, access to the requester;
based on determining that the request does not provide access information sufficient for the at least one computing device to automatically verify the access information, providing, by the at least one computing device, a graphical user interface in real time during the electronic meeting comprising a request interface, wherein said request interface provides user identification information from the request and receives input to grant or deny access to said requester.

9. The method set forth in claim 8, further comprising: comparing the access information with associated information stored in a database.

10. The method set forth in claim 9, wherein the access information is a login identification and a password.

11. The method set forth in claim 8, further comprising:
presenting, in the request interface an option to grant one or more of a plurality of rights to the requester.

12. The method set forth in claim 11, wherein one or more of a plurality of rights comprises temporary access.

13. The method set forth in claim 8, wherein the option in the request interface is provided after the request from the requester but prior to any automatic grant or denial of access.

14. The system set forth in claim 1, wherein the server is configured to identify a moderator within the electronic meeting, and wherein the graphical user interface is presented to the moderator.

15. The system set forth in claim 1, wherein the identification information is a name of said requester.

16. The system set forth in claim 1, wherein the identification information is an electronic mail address of said requester.

17. The system set forth in claim 1, wherein the identification information is an internet protocol address of a computing system used to request access to said system by said requester.

* * * * *